(12) United States Patent
Tagg

(10) Patent No.: US 6,507,958 B1
(45) Date of Patent: Jan. 21, 2003

(54) MULTI-FUNCTION BASE UNIT FOR PORTABLE STAND-ALONE RESTROOM FACILITY

(76) Inventor: Richard Leach Tagg, Ringshall House, Sandhutton, York (GB), Y04 1JZ ( * ) Notice: Subject to any disclaimer, the term of this patent is extended or adjusted under 35 U.S.C. 154(b) by 375 days.

(21) Appl. No.: 08/708,214

(22) Filed: Sep. 6, 1996

(51) Int. Cl.⁷ .................................................. E03D 1/00
(52) U.S. Cl. ............................................. 4/321; 4/476
(58) Field of Search ......................... 4/321, 449, 459, 4/462, 463, 663, 664, 665; 52/79.1

(56) References Cited

U.S. PATENT DOCUMENTS

| | | | |
|---|---|---|---|
| 2,946,065 A | * 7/1960 | Smith .......................... | 4/459 |
| 3,302,547 A | 2/1967 | Wasserman ................ | 454/253 |
| 3,423,766 A | * 1/1969 | Eger ......................... | 4/321 X |
| 3,447,167 A | 6/1969 | Harding ....................... | 4/462 |
| 3,776,383 A | 12/1973 | Hargraves ................. | 4/111.1 X |
| 3,835,480 A | 9/1974 | Harding ....................... | 4/459 |
| 3,873,445 A | 3/1975 | Bussard ...................... | 4/320 X |
| 4,031,572 A | 6/1977 | Harding ..................... | 4/463 X |
| D248,775 S | 8/1978 | Brown ......................... | D25/16 |
| D250,350 S | 11/1978 | Sargent et al. .............. | D25/16 |
| 4,305,164 A | * 12/1981 | Sargent et al. ................ | 4/462 |
| 4,446,585 A | 5/1984 | Harding et al. ............... | 4/460 |
| D275,520 S | 9/1984 | Harding et al. ............. | D25/16 |
| 4,493,118 A | 1/1985 | Braxton ........................ | 4/460 |
| 4,577,351 A | 3/1986 | Harding ........................ | 4/460 |
| 4,831,671 A | 5/1989 | Harding ........................ | 4/460 |
| D304,082 S | 10/1989 | Harding ...................... | D25/16 |
| 4,918,765 A | 4/1990 | Harding ........................ | 4/460 |
| 4,947,491 A | * 8/1990 | Parkinson et al. ............ | 4/321 |
| D349,578 S | 8/1994 | Tagg ........................... | D25/16 |

FOREIGN PATENT DOCUMENTS

| | | | |
|---|---|---|---|
| DE | 28 43 301 | 4/1980 | |
| GB | 2266735 | * 11/1993 | ................... 4/663 |
| GB | 2271581 | * 4/1994 | ................... 4/449 |
| JP | 0122237 | * 10/1978 | ................... 4/664 |

* cited by examiner

*Primary Examiner*—Robert M. Fetsuga
(74) *Attorney, Agent, or Firm*—Harness, Dickey & Pierce, P.L.C.

(57) ABSTRACT

A multi-function base unit for an outdoor portable restroom cabana that is molded from a plastic material to form a combined cabana floor, waste-holding tank, and pallet skids for support and for forklift access. The unit includes a base that defines a holding tank and a pallet that supports the cabana. The base includes a top floor panel enclosing the base holding tank. The panel may be removed for storing restroom components therein when the toilet cabana is in a knock-down state, and for storing waste when the cabana is assembled and used, and for stabilizing the cabana as the holding tank is filled. The base unit is designed with a floor on which either an Asian style or Western style toilet unit may be mounted with or without flushing capability.

6 Claims, 5 Drawing Sheets

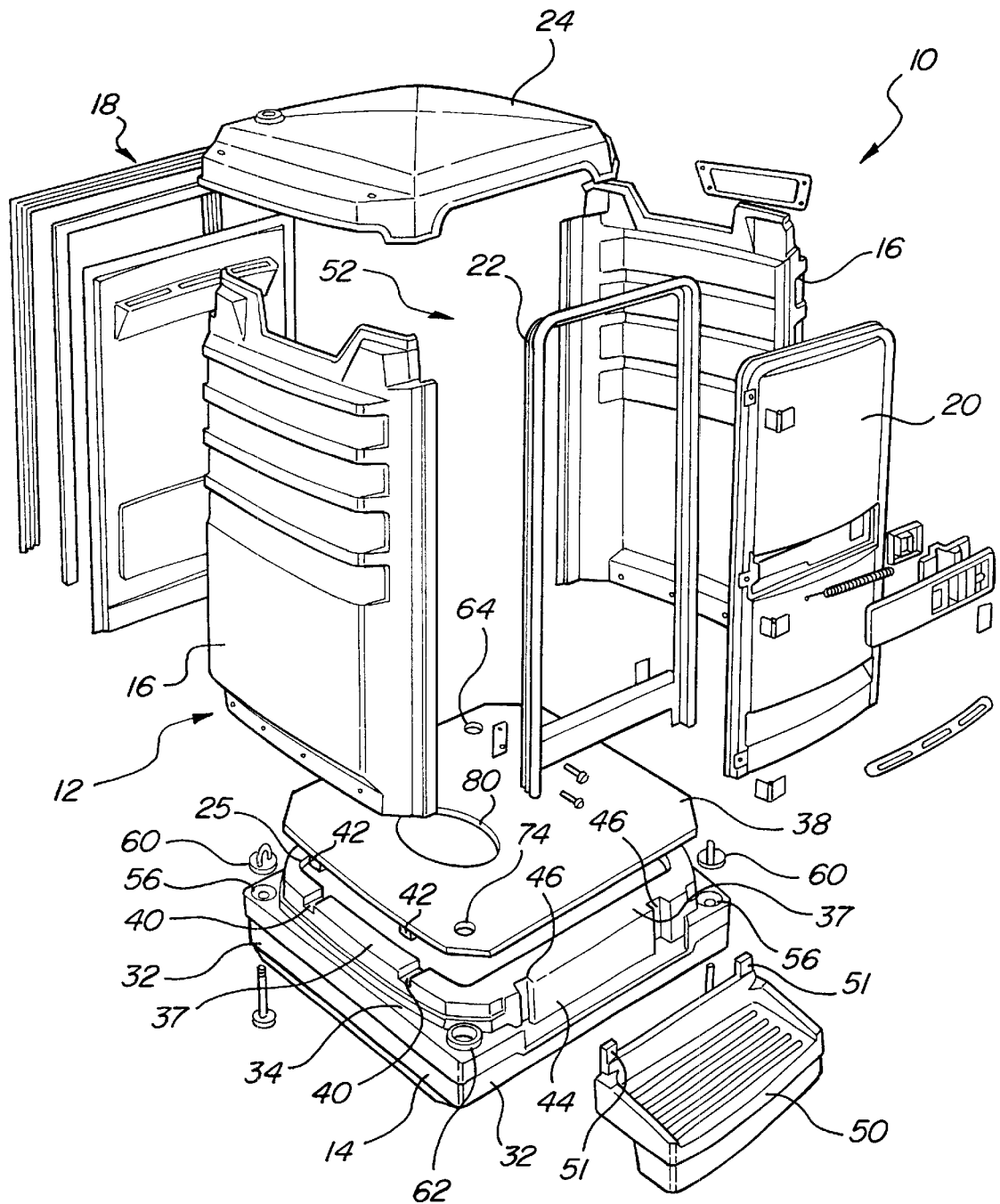

MULTI-FUNCTION BASE UNIT FOR PORTABLE STAND-ALONE RESTROOM FACILITY

BACKGROUND OF INVENTION

This invention relates to the construction of a base unit for a cabana of the type used for portable outdoor-type restroom facilities, with the base functioning as a shipping container for restroom facility components, a waste receptacle for toilet and sink units contained in the facility and, upon becoming filled with waste, a ballast for stabilizing the facility.

Portable standard cabanas housing toilets and sinks function as restroom facilities at outdoor public gatherings, construction sites and other locations where such facilities would otherwise be unavailable. Conventional cabanas typically include walls constructed from relatively large, thin sheets of thermoplastic material such as polyethylene-type plastic, secured to a base to define both the height and the width of the cabana enclosure. One wall panel typically includes a door frame with a door hingedly connected thereto for providing access to the interior of the cabana.

Conventional portable cabanas of the type generally described above vary widely in shape and size. Examples of such cabanas are disclosed in the following patents to Richard Leach Tagg: U.S. Pat. No. 5,550,960 for a "Portable Toilet Cabana", U.S. Pat. No. 5,500,962 for a "Portable Toilet Cabana", and U.S. Design Pat. Des. 360,471 for a "Portable Toilet Cabana".

Conventional portable toilet cabanas are designed to provide maximum interior volume. However, toilets, waste-holding tanks, sinks, fresh water holding tanks, and/or other restroom facility components typically installed within the cabana interior occupy a portion of the cabana interior. Typically, an integrated toilet and waste-holding tank are arranged upon the top of a pallet base or skid, as for example is illustrated in U.S. Pat. No. 3,835,480 to Harding for a "Chemical Toilet Cabana". However, such a design utilizes a significant portion of the cabana interior volume, thereby minimizing the available room for additional restroom components such as sink units and fresh water supplies.

In addition, conventional outdoor restroom facilities are not designed for use as either an Asian style toilet unit, which is essentially a unit built directly into the floor surface, or a Western style toilet unit of the type typically used in the United States, and shown in U.S. Pat. No. 5,550,960 referenced above.

Shipping these portable restroom units in a knock-down condition is costly, given their sizes and the numerous components that must be assembled. As with shipping of any bulky goods having numerous unassembled components, separate boxing of these components increases the probability of the components being either lost or misplaced during shipment.

Further, the waste-holding tanks that have been used with these portable restroom units are normally arranged along one of the inner walls of the cabana. When these tanks are substantially filled, they create an unbalanced weight distribution in the cabana. The unbalanced weight distribution problem increases the ease of tipping the cabana over by wind forces or by vandalism. Further, in conventional outdoor toilet facilities, the waste tanks must be emptied through an interior access port, such as through the toilet unit itself. This required interior access increases the difficulty of removing waste from the unit.

SUMMARY OF INVENTION

The invention contemplates a multi-function base unit for an outdoor portable toilet or restroom cabana that is molded from a plastic material to form a combined cabana floor, a waste-holding tank, and pallet for support and for forklift access. The unit includes a hollow base that forms a holding tank and is shaped for forklift access thereunder. The holding tank is also a storage unit for facility components therein when the toilet cabana is in a knock-down state, a waste storage unit during cabana use, and a ballast for stabilizing the cabana as the holding tank is filled.

The structure of the present invention increases the space available within the cabana when compared to conventional outdoor restroom cabanas. The base unit also functions as a shipping container for the restroom facility components, such as the toilet and the sink unit, thereby minimizing shipping costs and the probability of components becoming separated or lost during shipment. In addition, the base unit functions as a ballast to stabilize the restroom facility as the waste-holding tank of the base unit becomes filled, thereby minimizing the chance of the cabana being tipped over. Also, the base unit is designed with a floor on which either an Asian style or Western style toilet unit may be positioned, with or without flushing capabilities.

An object of this invention is to provide a base unit for a modular portable outdoor cabana structure, with the base unit being molded to include a waste-holding tank beneath the base unit floor, thereby increasing the available volume within the cabana structure.

Another object of this invention is to provide a base unit for a modular portable outdoor cabana, with the base unit being molded to include a waste-holding tank beneath the base unit floor that functions as a ballast for the structure, thereby minimizing the chance of the structure being tipped over.

Yet another object of this invention is to provide a base unit for a modular portable outdoor structure, with the base unit being molded to include a waste-holding tank beneath the base unit floor that functions as a chassis for ensuring correct assembly of wall panels and other components of the structure.

An object of the present invention is to provide a base unit for a portable outdoor structure that is molded from a plastic material to include skids for forklift access.

A further object of the present invention is to provide a base unit for a portable outdoor restroom facility that includes a waste-holding tank that doubles as a shipping container for storage and shipment of facility components when the facility is disassembled.

Also, an object of the present invention is to provide a base unit for a portable outdoor restroom facility that is molded from a plastic material to include a waste-holding tank below a substantially planar floor that is designed for use with either Asian or Western style toilet units, with or without flushing capabilities.

Yet another object of this invention is to provide a base unit for a portable stand-alone restroom facility that may be retrofit on existing restroom facilities, thereby minimizing implementation costs associated therewith.

These and other objects and advantages of this invention will become apparent upon reading the following description, of which the attached drawings form a part.

DESCRIPTION OF DRAWINGS

FIG. 2 is an exploded view of the cabana and the base unit according to the present invention;

DETAILED DESCRIPTION

Figure 1:
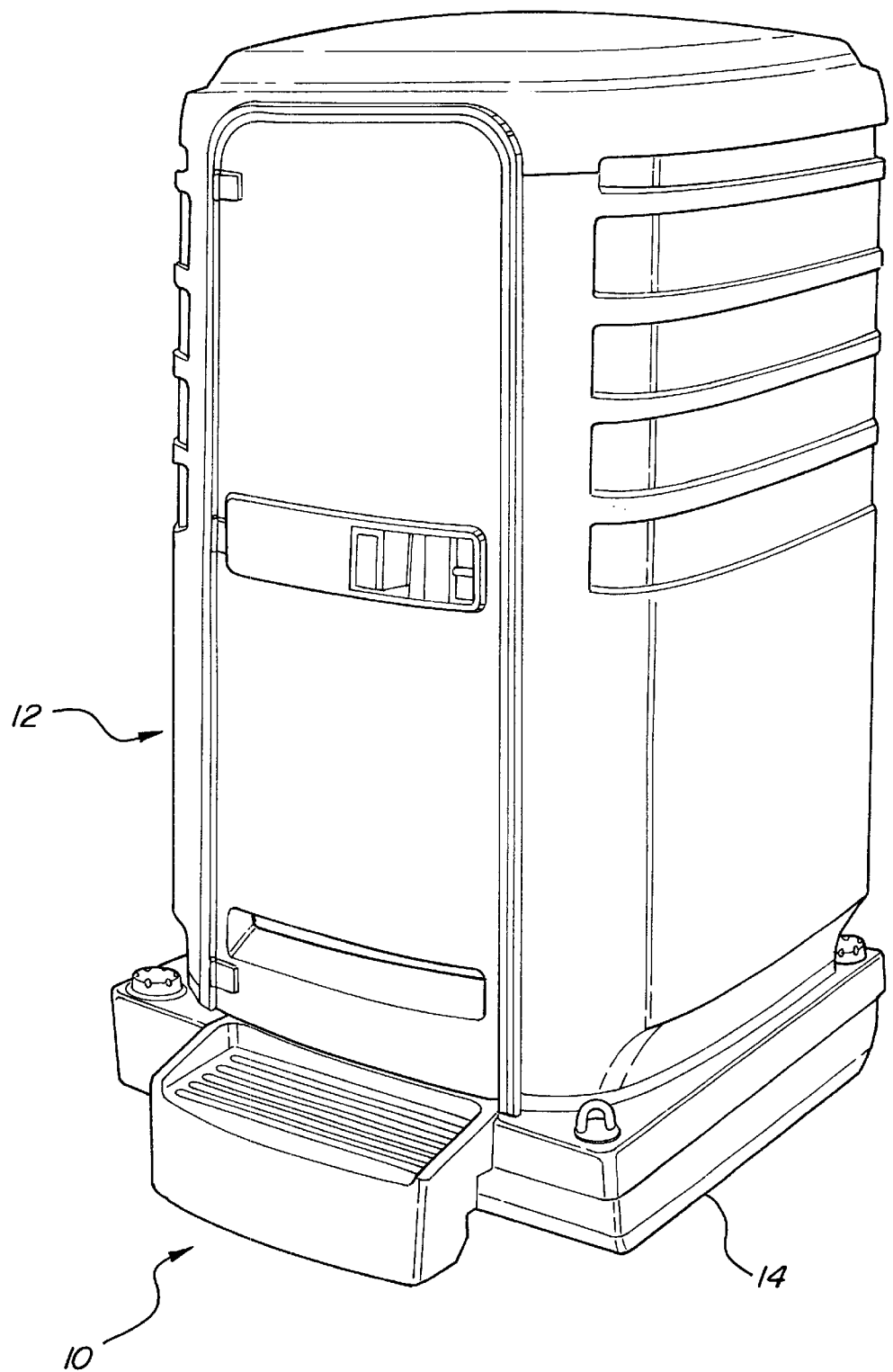
FIG. 1 is a perspective view of an outdoor toilet cabana restroom facility, including a floor or base that includes skids and a waste-holding tank, according to a preferred embodiment of the present invention.

Referring to the drawings, a portable stand-alone toilet facility 10 is shown in FIG. 1. The facility includes a four-sided cabana 12. The cabana includes a hollow multi-function base or floor unit 14 that functions as a waste-holding tank, a storage unit for restroom facility components during shipping of the components and, as the base unit becomes filled, as a ballast to prevent tipping or undesired movement of the restroom facility from its placement location. In addition, the base unit 14 functions as a chassis to facilitate correct insertion and placement of all the restroom or toilet components that form the toilet facility. The structure and function of the restroom facility 10 will be discussed in more detail below.

Referring to FIG. 2, an exploded view of the outer structure of the restroom 10 is shown. The cabana 12 includes two molded side panels 16, a molded rear panel and frame shown generally at 18, and a door 20 pivotally connected to door frame 22. The cabana is enclosed by a molded roof 24. The restroom facility cabana is of the type generally disclosed in the above referenced patents.

Figure 3:
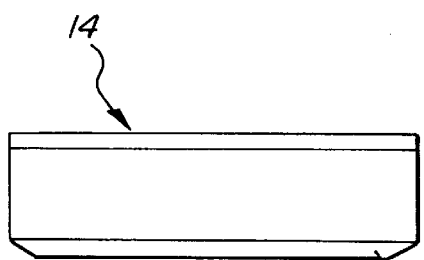
FIG. 3 is a schematic side elevational view of the cabana base unit.
Figure 4:
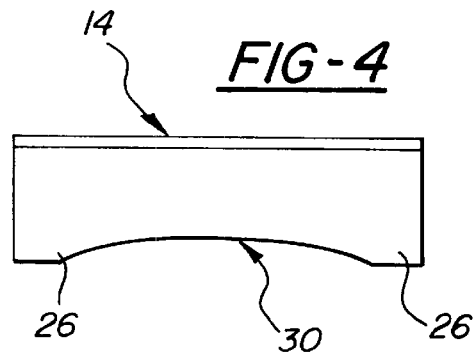
FIG. 4 is a schematic front elevational view of the base unit of FIG. 3.

Referring to FIGS. 2–4, the base unit 14 is preferably formed by rotationally molding a high-density plastic material such as polyethylene. As an example of size, the base unit may be formed so as to define a waste-holding tank 25 having a capacity of approximately 400 liters, which is almost double the approximate 200 liter capacity of typical commercially available units. The bottom of the base unit is formed with parallel skids 26, between which is a forklift access area 30 (See FIG. 4). Base unit 14 also includes outer peripheral walls 32 that define the outermost dimensions of the base unit. For example, the base unit can be about 47" square. The base unit has a peripheral ledge 34 and secondary peripheral walls 36 which extend upwardly from the peripheral ledge 34. The walls define a floor perimeter rim 37 upon which a floor panel 38 is placed. The floor panel is preferably formed from thick plastic board, as for example 0.5 inches thick. The inner peripheral walls 36 also have sockets 40 that receive floor joists 42 which engage and extend beneath the lower surface of the floor panel. These joists increase the structural integrity of the base unit and reinforce the floor panel 38 in supporting loads placed thereon.

The base unit itself, including the floor panel 38, may be, for example, approximately 14 inches in height. When fully assembled, the cabana 12, including the base unit 14, has approximately 2.10 meters in internal headroom and an external height of about 2.5 meters. The base unit therefore does not significantly increase the height of the facility.

As shown in FIG. 2, a recess 44 including hinge receptacles 46 is formed in the front of the base unit for facilitating hinging of a step 50 to the front of the base unit 14, upwardly. The sides of the step are hinged by hinges, such as those shown at 51, to the base unit so that it may be pivoted upwardly. into the cabana interior space defined by the panels 16, 18, the door 20 and the roof 24, and indicated generally at 52. The step 50 may be pivoted into the cabana interior 52 during movement of the cabana to minimize the chance of damage to the step and to reduce the floor space needed on a vehicle used to move the cabana.

Still referring to FIG. 2, the peripheral ledge 34 has threaded receptacles 56, at a pair of opposite corners. The receptacles threadably receive rings or eye-type plugs 60. The plugs form tie points or rings 60 to which cables can be attached for lifting the cabana by an overhead boom, such as used on delivery trucks or a crane lift. In addition, the peripheral ledge 36 includes an external waste removal port 62 that opens into the interior of the base to allow waste to be removed from the base unit without the necessity for accessing the waste tank through the toilet as is conventional. This represents a significant improvement over conventional restroom facilities, whose waste must typically be removed by inserting a pipe into the waste-holding tank through the toilet opening. A cap, such as a screw type cap, can be used to cover the port.

Figure 5:
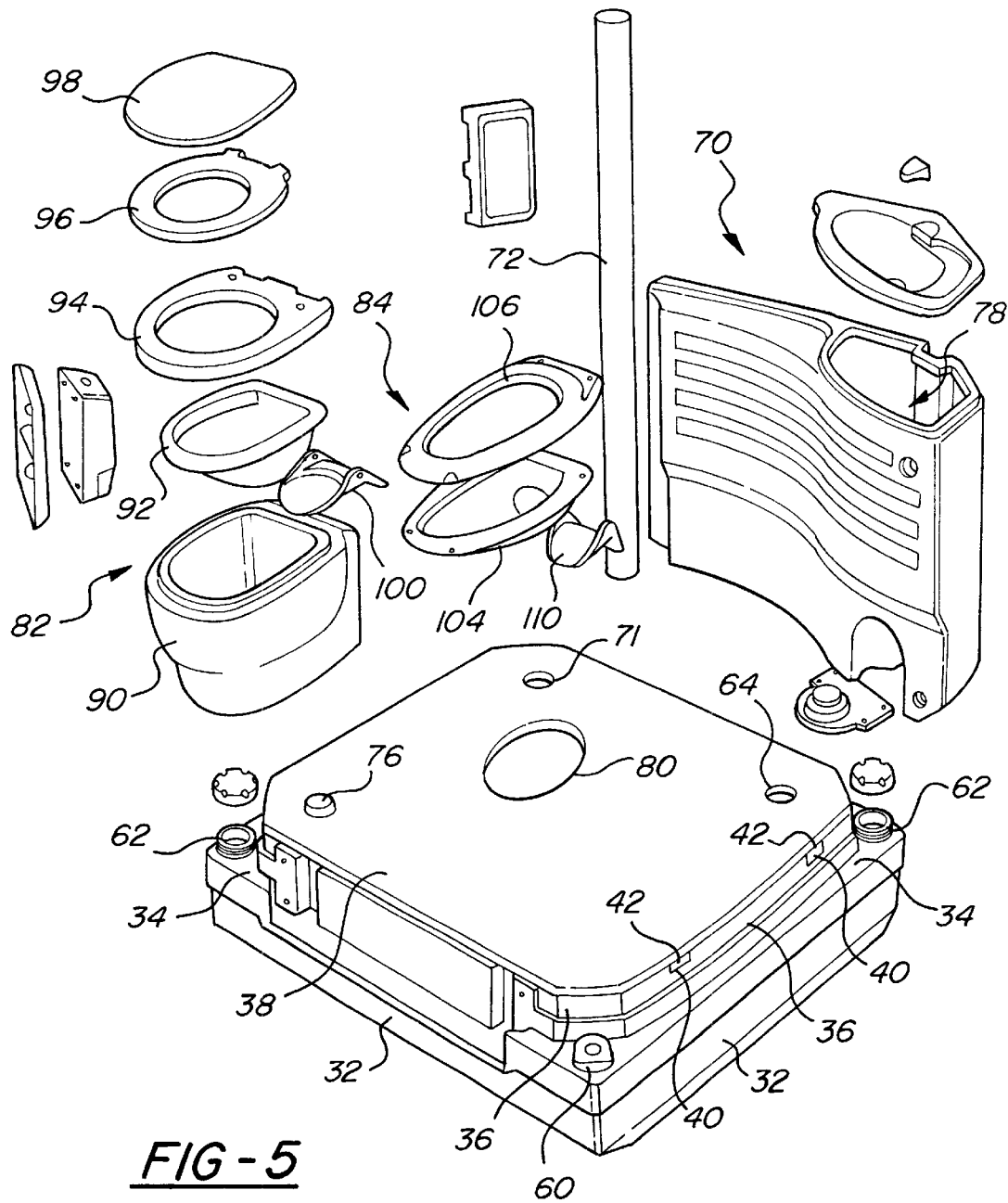
FIG. 5 is an exploded view of the interior components of the cabana and shows both Western style and Asian style toilet components which may be used alternatively.

Referring to FIGS. 2 and 5, the floor panel 38 has a waste water port 64 for draining waste water or dispensing of gray water from a sink unit 70 (FIG. 5). The floor panel also has a vent stack port 71 for communication of a vent stack 72 (FIG. 5) with the base unit holding tank 25 to allow noxious vapors to escape to the outside of the restroom facility. The floor panel also includes a pump port 74 in which a conventional foot pump 76 is placed. The foot pump 76 is connected via hydraulic lines (not shown) to a fresh water holding tank 78 arranged within the sink unit 70 to facilitate flushing of a toilet unit, if desired. By way of example, the holding tank 78 is designed to hold approximately 110 liters of fresh water, with a depth from the front side to the rear side of the tank, being, for example, 12 inches at the location of the sink and 6–8 inches at the counter. Such dimensions allow the entire unit 70 to be fitted within the holding tank defined by the base unit 14 along with other unit components for storage and shipping. The floor panel also includes toilet port 80 over which a toilet unit, such as a Western style toilet shown generally at 82, or an Asian style toilet shown generally at 84, is placed and through which the toilet 82 or 84 communicates with the waste-holding tank 25.

Referring again to FIG. 5, the Western style toilet unit includes an outer. carrier 90, an inner bowl 92, a support 94, a toilet seat 96, and a toilet lid 98, all of which are made of conventional materials well known in the art. The toilet unit also includes a flap 100 which is used to seal the toilet unit port 80 during periods of non-use of the toilet unit.

Alternatively, an Asian style toilet unit 84 may be used with the base unit 14 of the present invention. The Asian style toilet unit is typically a direct drop, non-flush toilet unit including an Asian bowl 104 and an outer peripheral rim 106, both of which are raised only slightly above the plane of the floor panel 38. If the Asian toilet unit 84 is of the flushing type, the unit also includes a flap 110 of the type similar to the flap 100 associated with the Western toilet unit 82.

Figure 6:
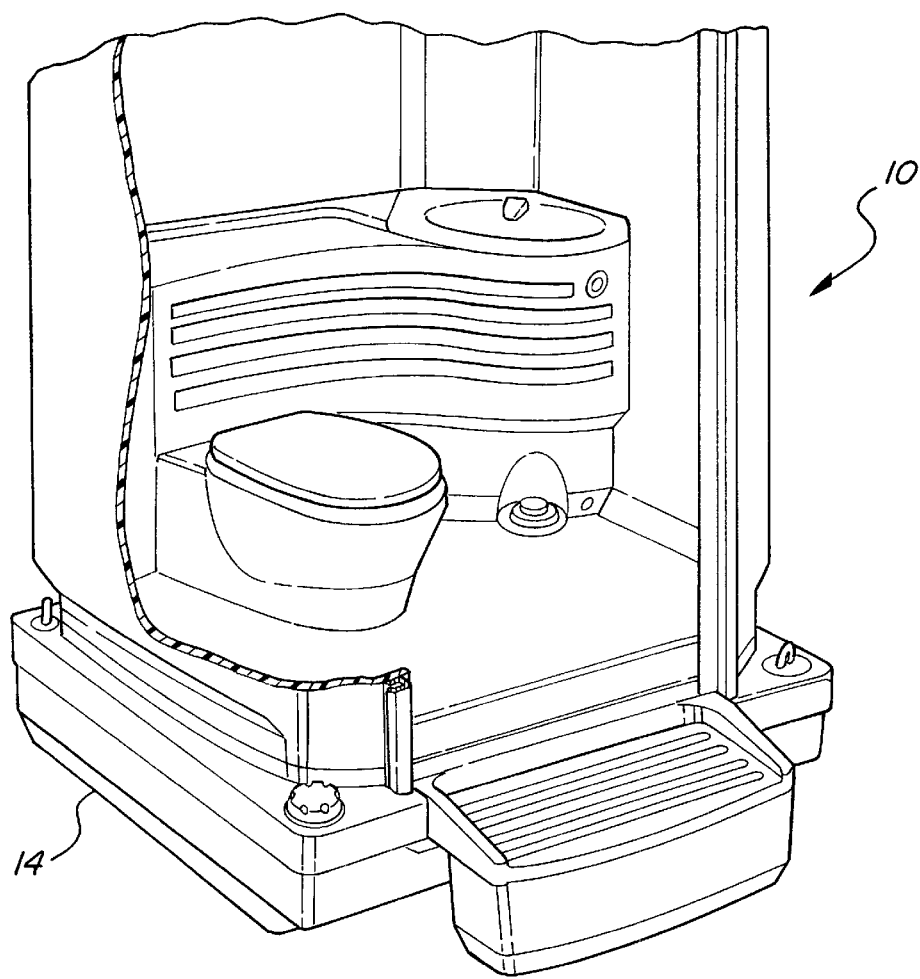
FIG. 6 is a perspective view with a portion of the outdoor cabana walls being removed to show the components arranged within the cabana.
Figure 7:
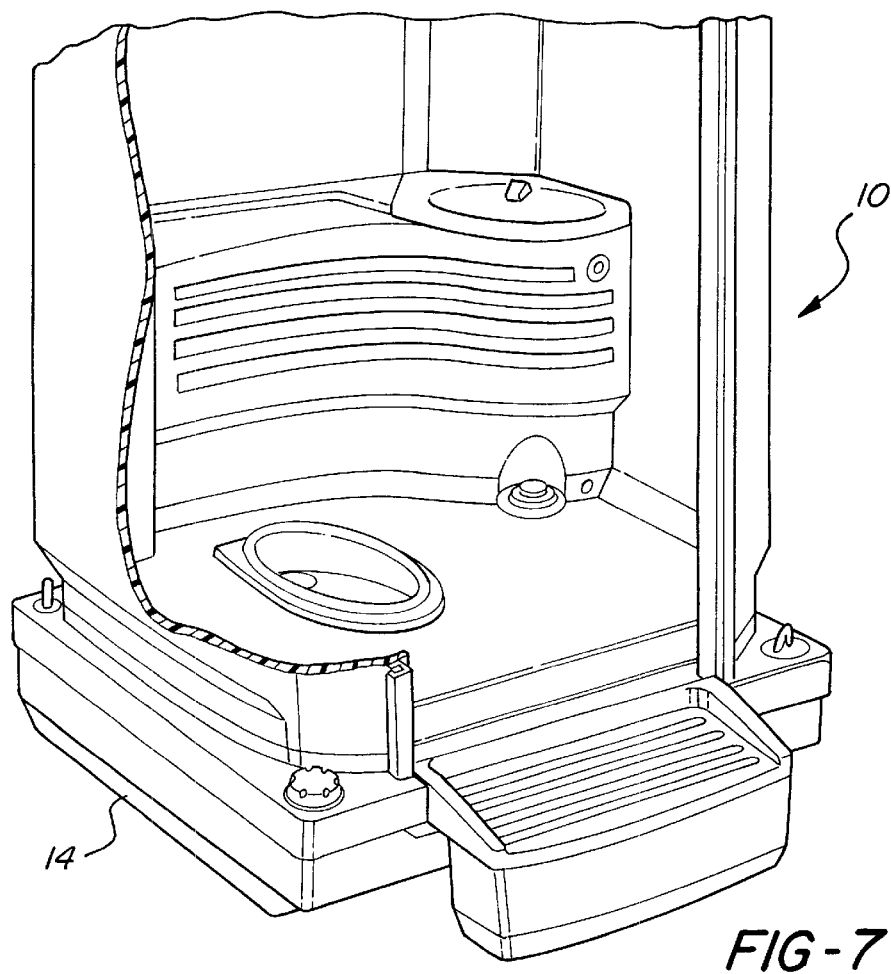
FIG. 7 is a perspective view with a portion of the cabana walls being cut away to show an alternative, Asian style, toilet embodiment.

It is contemplated that either the Western style toilet unit 82 or the Asian style toilet unit 84 may be used with the base unit 14 of the present invention. Either of the units may be used either in a flushless, direct drop mode or in a flush mode. For flush type use, a flush foot pump 74 is operatively connected by a water line from the sink unit holding tank 70 to the toilet in a conventional manner, such that two foot strokes of the pump dispense about one-half liter of water into the toilet for flushing purposes. In final assembled form, the Western facility interior in which the Western style toilet is installed is shown generally at 110, in FIG. 6, while a restroom facility in which an Asian style toilet unit is installed is shown at 112 in FIG. 7.

Figure 8:
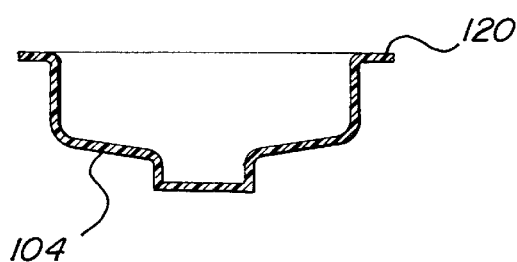
FIG. 8 is a schematic cross-sectional view of the Asian style toilet bowl shown in FIG. 5.
Figure 9:
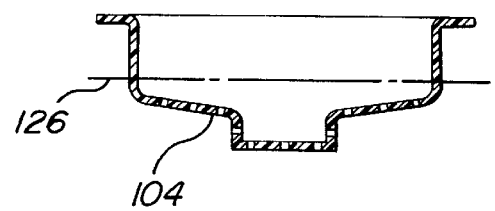
FIG. 9 is a schematic cross-sectional view of the Asian style toilet bowl shown in FIG. 5 indicating the section of the bowl to be trimmed if the bowl is to be used in a direct drop application.

Depending upon the particular type of Asian style toilet unit desired, it is contemplated that either a direct drop or a water flush Asian toilet bowl can be manufactured utilizing a single mold. As shown in the cross-sectional views in FIGS. 8 and 9, a flush type Asian style bowl is shown having a peripheral lip 120 to accommodate a spigot (not shown) and running water to prevent the running water from overflowing onto the floor panel 38. If a direct drop type Asian style toilet bowl is desired, the flush-type bowl is trimmed accordingly to the height indicated by the dotted line at 126. Thus, only a single mold need be manufactured for both types of Asian bowls.

It is also contemplated that the sink unit 70, toilet unit 82 or 84, and all associated components thereof are of dimensions that allow the components to be stored within the waste holding tank formed by the base unit. When placed within the holding tank as such, floor panel 38 may be placed over the tank, and the holding tank thus functions as a shipping container for the restroom facility components. Thus, the base unit 14 serves not only as a waste holding tank during utilization of the restroom facility, but also as a storage/shipping container during storage/shipping of the restroom facility and its associated components.

Additionally, it should be appreciated that the holding tank formed by the base unit, through its design, tends to uniformly distribute waste deposited from toilet and the sink unit 70. This is a significant improvement over prior art outdoor restroom facilities, as waste deposited in prior art units was typically deposited in a holding tank which was located at rear wall of the cabana, thereby resulting in an uneven weight distribution toward the end of the usage period. Such uneven weight distribution made such prior art facilities prone to tipping over due to natural forces such as wind, or as a result of vandalism. The base unit 14, through its design, functions as a ballast for the cabana, thereby making the facility more stable as the facility and its sink unit and toilet are used.

As compared to prior outdoor restroom cabana designs, the base unit 14 increases available space within the facility interior, and at the same time provides additional stability to the cabana. In addition, the multi-function base unit of the present invention increases the waste-holding capacity as the waste-holding tank is formed without concern about using space within the interior of the cabana. Further, the base unit of the present invention acts as a chassis for easy assembly and disassembly of wall panels attached thereto. In addition, the base unit of the present invention may be retrofitted onto existing restroom facility cabana configurations, to replace older existing base units and skids. That is, the walls, roof and interior toilet and service components of prior types of cabana installations can be disassembled from the prior floor or support pallet used and reassembled upon the base of this invention, to convert two prior facilities into the improved construction provided by this base unit. Further, the bottom of the base unit is molded to form skids, thereby facilitating ease of access to the underside of the base unit for moving the assembled restroom facility, or the base unit itself, by forklift or other automated means. Finally, the holding tank formed within the base unit of the present invention functions as a shipping container for storage and/or shipment of components used within the restroom facility, thereby minimizing chance of misplacement or loss of these components during the shipping process.

This invention may be further developed within the scope of the following claims. Thus, the foregoing description is intended to be illustrative of an operative embodiment and not in a strictly limiting sense. Having fully described an operative embodiment of this invention, I now claim:

1. A portable toilet cabana having a plurality of walls forming a restroom apparatus interior, comprising:

a unitary hollow molded base defining both a pallet and a waste holding tank the plurality of walls are mounted upon said pallet, and said waste holding tank is located beneath the cabana, said waste holding tank being substantially enclosed by and under a planar floor panel having a toilet unit aperture which communicates with said waste holding tank; and a toilet unit connected to said floor panel to communicate with said substantially hollow base through said toilet unit aperture for distribution of waste deposited therein and a waste removal port positioned outside of the cabana providing external access from outside of the cabana for removing waste from the holding tank.

2. The portable toilet cabana of claim 1, wherein said substantially hollow base is formed from rotationally molded plastic.

3. The portable toilet cabana of claim 1, further comprising a pump implemented to dispense water within a sink unit and said toilet unit.

4. The portable toilet cabana of claim 1, further comprising at least one floor panel support selectively engaged with said substantially hollow base to reinforce said floor panel.

5. The portable toilet cabana of claim 1, wherein said base comprises a chassis for facilitating correct placement of cabana components thereon.

6. A portable toilet cabana having a plurality of walls forming a restroom apparatus interior, comprising:

a substantially hollow molded base defining a pallet upon which the walls are mounted, the base being hollow to form a waste holding tank located beneath the cabana, said waste holding tank being substantially enclosed by a planar floor panel having a toilet unit aperture;

a toilet unit connected to said floor panel to communicate with said substantially hollow base through said toilet unit aperture for distribution of waste deposited therein; and at least one floor panel support selectively engaged with said substantially hollow base to reinforce said floor panel, wherein said floor panel support comprises a plastic beam fitted into receptacles formed in the hollow tank.

\* \* \* \* \*